(12) United States Patent
Noll et al.

(10) Patent No.: US 10,248,430 B2
(45) Date of Patent: Apr. 2, 2019

(54) RUNTIME RECONFIGURABLE DISSIMILAR PROCESSING PLATFORM

(71) Applicant: Hamilton Sundstrand Corporation, Charlotte, NC (US)

(72) Inventors: Christopher Brian Noll, Glastonbury, CT (US); Steven A. Avritch, Bristol, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 154 days.

(21) Appl. No.: 15/381,918

(22) Filed: Dec. 16, 2016

(65) Prior Publication Data

US 2018/0173537 A1     Jun. 21, 2018

(51) Int. Cl.
G06F 9/44 (2018.01)
G06F 9/4401 (2018.01)
G05D 1/00 (2006.01)

(52) U.S. Cl.
CPC ......... G06F 9/4405 (2013.01); G05D 1/0077 (2013.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505; G06F 1/23; G06F 11/16
See application file for complete search history.

(56) References Cited

U.S. PATENT DOCUMENTS

| | | | | | |
|---|---|---|---|---|---|
| 4,622,667 | A * | 11/1986 | Yount | ...................... | G05B 9/03 700/79 |
| 5,515,282 | A * | 5/1996 | Jackson | ............... | G05D 1/0077 700/4 |
| 5,721,888 | A * | 2/1998 | Miller | ................... | G06F 13/385 710/8 |
| 5,802,077 | A * | 9/1998 | Yeh | ....................... | G05D 1/0077 370/242 |
| 5,984,504 | A * | 11/1999 | Doyle | ...................... | G05B 9/03 700/108 |
| 7,263,630 | B2 * | 8/2007 | Sailer | ....................... | G05B 9/03 700/79 |

(Continued)

FOREIGN PATENT DOCUMENTS

CN    201526375 U    7/2010
CN    101705872 B    11/2011

(Continued)

OTHER PUBLICATIONS

Search Report dated May 4, 2018 in EP Application No. 17207815, 7 pages.

*Primary Examiner* — Zahid Choudhury
(74) *Attorney, Agent, or Firm* — Cantor Colburn LLP

(57) ABSTRACT

One or more embodiments here relate to a processing platform for performing channel management and channel monitoring of a control channel. The processing platform includes a first microcontroller comprising a first core. The processing platform includes a second microcontroller comprising a second core. The second microcontroller is dissimilar to the first microcontroller. The first core is in an active state to perform the channel management of the control channel. The second core is in a monitor state to perform the channel monitoring of the control channel.

11 Claims, 3 Drawing Sheets

(56) References Cited

U.S. PATENT DOCUMENTS

| | | |
|---|---|---|
| 8,156,251 B1 | 4/2012 | Sorensen et al. |
| 8,494,690 B2 | 7/2013 | Krogh |
| 8,744,738 B2 | 6/2014 | Bushnell |
| 8,761,971 B2 | 6/2014 | Gershzohn |
| 9,354,632 B2 | 5/2016 | Freeman |
| 9,383,738 B2 | 7/2016 | Huang et al. |
| 9,432,135 B2 | 8/2016 | Hartlmueller et al. |
| 2006/0100750 A1 | 5/2006 | Platzer et al. |
| 2014/0214356 A1 | 7/2014 | Hess et al. |
| 2015/0019187 A1 | 1/2015 | Jones et al. |
| 2015/0339930 A1 | 11/2015 | McCann et al. |
| 2015/0350317 A1 | 12/2015 | Gvillo |
| 2016/0283647 A1 | 2/2016 | Di Mare et al. |
| 2016/0073048 A1 | 3/2016 | Howe |
| 2016/0139876 A1 | 5/2016 | Alves et al. |
| 2016/0176504 A1 | 6/2016 | Lassen et al. |
| 2016/0176512 A1 | 6/2016 | Pangilinan et al. |
| 2016/0272300 A1 | 9/2016 | Matsui |
| 2016/0279789 A1 | 9/2016 | Axinte et al. |
| 2016/0280392 A1 | 9/2016 | Thoreen et al. |

FOREIGN PATENT DOCUMENTS

| | | |
|---|---|---|
| CN | 102541698 A | 7/2012 |
| CN | 103198047 A | 7/2013 |
| CN | 102650962 B | 4/2015 |
| CN | 105045672 A | 11/2015 |
| CN | 105426329 A | 3/2016 |
| CN | 105550074 A | 5/2016 |
| CN | 103611324 B | 8/2016 |
| EP | 2851291 A1 | 3/2015 |
| KR | 101260325 B1 | 5/2013 |
| WO | 2015025262 A1 | 2/2015 |
| WO | 2016083494 A1 | 6/2016 |

\* cited by examiner

Table 310

| Channel | Controller | Active | Monitor | Unused |
|---|---|---|---|---|
| 1 | A | x | | |
| 1 | B | | x | |
| 1 | C | | | x |
| 2 | A | | x | |
| 2 | B | x | | |
| 2 | C | | | x |
| 3 | A | x | | |
| 3 | B | | | x |
| 3 | C | | x | |
| 4 | A | | x | |
| 4 | B | | | x |
| 4 | C | x | | |
| 5 | A | | | x |
| 5 | B | x | | |
| 5 | C | | x | |
| 6 | A | | | x |
| 6 | B | | x | |
| 6 | C | | x | |

Table 350

| Channel | Chip | Soft Core | Active | Monitor |
|---|---|---|---|---|
| 1 | FPGA 0 | A | x | |
| 1 | FPGA 1 | B | | x |
| 2 | FPGA 0 | A | | x |
| 2 | FPGA 1 | B | x | |
| 3 | FPGA 0 | C | x | |
| 3 | FPGA 1 | B | | x |
| 4 | FPGA 0 | C | | x |
| 4 | FPGA 1 | B | x | |
| 5 | FPGA 0 | A | x | |
| 5 | FPGA 1 | C | | x |
| 6 | FPGA 0 | A | | x |
| 6 | FPGA 1 | C | x | |
| 7 | FPGA 0 | B | x | |
| 7 | FPGA 1 | A | | x |
| 8 | FPGA 0 | B | | x |
| 8 | FPGA 1 | A | x | |
| 9 | FPGA 0 | B | x | |
| 9 | FPGA 1 | C | | x |
| 10 | FPGA 0 | B | | x |
| 10 | FPGA 1 | C | x | |
| 11 | FPGA 0 | C | x | |
| 11 | FPGA 1 | A | | x |
| 12 | FPGA 0 | C | | x |
| 12 | FPGA 1 | A | x | |

FIG. 3

RUNTIME RECONFIGURABLE DISSIMILAR PROCESSING PLATFORM

BACKGROUND

Exemplary embodiments pertain to flight control systems of an aircraft, and more particularly to runtime reconfigurable dissimilar processing platforms for the triplex flight control systems.

In general, contemporary flight control systems for aircrafts utilize multiple redundant channels to carry signals between controllers and components. Aviation authorities require that the contemporary flight control systems utilize dissimilar controllers to perform channel management and channel monitoring of the multiple redundant channels. For instance, three different controller configurations are required when three redundant channels are utilized.

BRIEF DESCRIPTION

One or more embodiments here relate to a processing platform for performing channel management and channel monitoring of a control channel. The processing platform includes a first microcontroller comprising a first core. The processing platform includes a second microcontroller comprising a second core. The second microcontroller is dissimilar to the first microcontroller. The first core is in an active state to perform the channel management of the control channel. The second core is in a monitor state to perform the channel monitoring of the control channel.

One or more embodiments here relate to a configurable triple channel system. The configurable triple channel system includes a plurality of control channels and a plurality of processing platforms. Each processing platform is associated with one of the plurality of control channels and is configured to perform channel management and channel monitoring of the associated one of the plurality of control channels. Each processing platform includes a first microcontroller and a second microcontroller. The second microcontroller is dissimilar to the first microcontroller. Different cores are loaded onto the first microcontroller and the second microcontroller.

Additional features and advantages are realized through the techniques of the present disclosure. Other embodiments and aspects of the disclosure are described in detail herein. For a better understanding of the disclosure with the advantages and the features, refer to the description and to the drawings

BRIEF DESCRIPTION OF THE DRAWINGS

The following descriptions should not be considered limiting in any way. With reference to the accompanying drawings, like elements are numbered alike:

FIG. 3 depicts a set of tables illustrating advantages of a configurable triple channel system including two processors in accordance with one or more embodiments.

DETAILED DESCRIPTION

A detailed description of one or more embodiments of the disclosed apparatus and method are presented herein by way of exemplification and not limitation with reference to the Figures.

Embodiments herein relate to a configurable system, apparatus, and/or method (herein collectively referred to as a configurable system) that utilizes runtime reconfigurable dissimilar processing platforms to provide, for each control channel, at least two dissimilar configurable processing components implementing soft core technology.

The technical effects and benefits of embodiments of the configurable system, thus, include minimizing excess equipment and a corresponding weight penalty in flight control systems of aircrafts, while providing versatility previously unavailable in contemporary flight control systems. Embodiments described herein are necessarily rooted in the configurable processing components of the configurable system to perform proactive operations to overcome problems specifically arising in the realm of making control channels interchangeable. These problems are now further described with reference to contemporary flight control systems, and more particularly to contemporary commercially certifiable triplex flight control systems.

Contemporary commercially certifiable triplex flight control systems include three channels (hence 'triplex') and are commercially certifiable because they are constructed and configured to meet aviation requirements set forth by aviation authorities. For example, a first aviation requirement includes that each channel requires two controllers to be in an active state and monitor state. The active state is an operational mode of the corresponding processor that manages signals on the corresponding channel (e.g., channel management). The monitor state is an operational mode of the corresponding processor that observes the operations of the controller that is in an active state (e.g., channel monitoring). A second aviation requirement includes that the two controllers of each channel must be different/dissimilar from each other. For instance, a first of the two controllers must be from a manufacturer that is different than a manufacturer of a second of the two controllers. A third aviation requirement includes that each channel must have a different combination of two controllers from a combination of all other channels.

Figure 1:
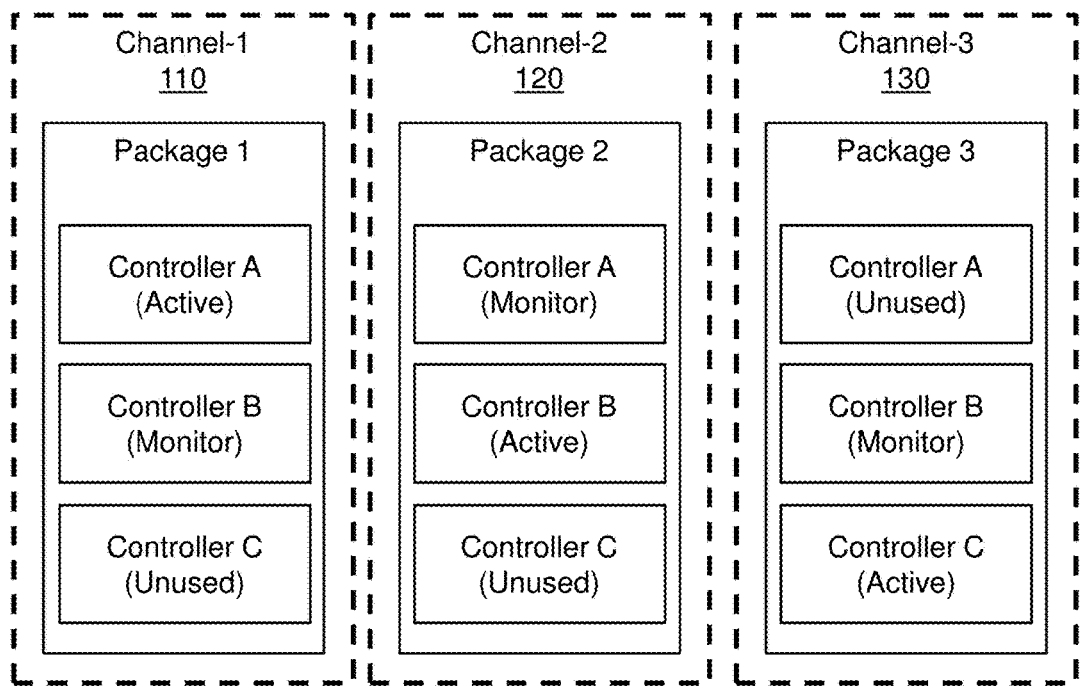
FIG. 1 depicts a conventional triple channel system.

FIG. 1 depicts a contemporary commercially certifiable triplex flight control systems 100 of an aircraft. The conventional triple channel system 100 includes three channels: Channel-1 110, Channel-2 120, and Channel-3 130. The conventional triple channel system 100 includes three controller packages: Package 1, Package 2, and Package 3. Each controller package is an apparatus that is associated with one of the three channels as shown.

Each controller package includes three dissimilar controllers (each controller is from a different manufacturer): Controller A, Controller B, and Controller C. A combination of two different controllers is selected from the three dissimilar controllers of each controller package. Of the two selected dissimilar controllers, one controller is in an active state and one controller is in a monitor state. In turn, an unselected controller of the three dissimilar controllers is set to a disabled state. The disabled state is an off-mode of the corresponding processor where that processor contributes nothing to channel management or channel monitoring.

For example, with respect to Channel-1 110, Processor A of Package 1 is in the active state, Processor B of Package 1 is in the monitor state, and Processor C of Package 1 is in the disabled state. With respect to Channel-2 120, Processor A of Package 2 is in the monitor state, Processor B of Package 2 is in the active state, and Processor C of Package 2 is in the disabled state. With respect to Channel-3 130, Processor A of Package 3 is in the disabled state, Processor B of Package 3 is in the monitor state, and Processor C of Package 3 is in the active state. Thus, while the controller packages enable the conventional triple channel system 100 to meet the aviation requirements described herein, each channel in the conventional triple channel system 100 is always associated with an unselected controller in a disabled state, which adds excess equipment and a corresponding weight penalty to the conventional triple channel system 100.

Figure 2:
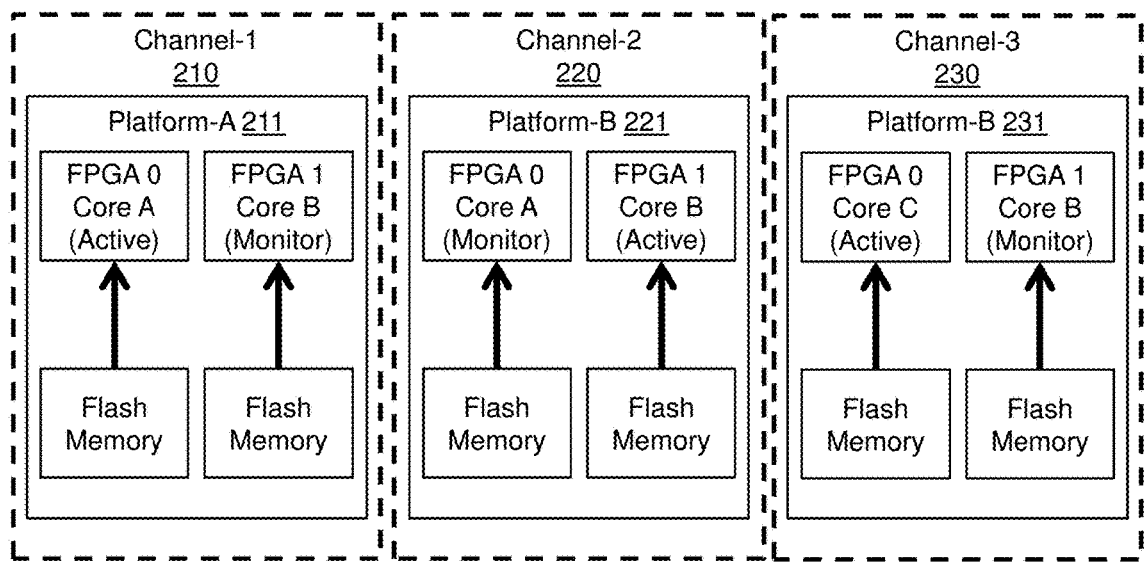
FIG. 2 depicts a configurable triple channel system including two processors in accordance with one or more embodiments.

Turning to an overview of aspects of embodiments herein, the configurable system is now described with respect to FIG. 2. FIG. 2 depicts a configurable triple channel system 200 (e.g., the configurable system) including three control channels: Channel-1 210, Channel-2 220, and Channel-3 230. The configurable triple channel system 200 includes three runtime reconfigurable dissimilar processing platforms (herein referred to as processing platforms): Platform-A 211, Platform-B 221, and Platform-C 231. Each processing platforms is an apparatus that is associated with one of the three control channels as shown.

Each processing platform includes two dissimilar microcontrollers: field-programmable gate array (FPGA) 0 and FPGA 1. A FPGA is an integrated circuit designed to be configured by a customer or a designer after manufacturing—hence "field-programmable." The configurable triple channel system 200 makes use of each FPGA by configuring a "soft core" on that FPGA. In this way, each FPGA can be configured in a dissimilar way so as to meet aviation requirements by loading a unique soft core from a corresponding flash memory at runtime (one of three core designs) and executing resident software in one of two operational states (active or monitor) associated with that core.

As shown in FIG. 2, with respect to Platform-A 211, FPGA 0 includes a Core A that is in the active state and FPGA 1 includes a Core B that is in the monitor state. With respect to Platform-B 221, FPGA 0 includes a Core A that is in the monitor state and FPGA 1 includes a Core B that is in the active state. With respect to Platform-C 231, FPGA 0 includes a Core C that is in the active state and FPGA 1 includes a Core B that is in the monitor state. Note that the active state is an operational mode of a core that manages signals on a corresponding control channel. Also, note that the monitor state is an operational mode that observes operations of a core that is in an active state on the same control channel. Further, if a failure occurs with the core and/or the FPGA associated with the active state, the corresponding core and/or FPGA in the monitor state can change to the active state and perform channel management. The configurable triple channel system 200, thus, minimizes excess equipment and a corresponding weight penalty in flight control systems of aircrafts (e.g., the disabled controller), while providing versatility previously unavailable in contemporary flight control systems (e.g., the configurable soft cores).

In an example operational embodiment, the configurable triple channel system 200 can be employed by one or more flight control computers (FCC) of an aircraft. Each FCC can contain a processing platform (e.g., one of Platform-A 211, Platform-B 221, and Platform-C 231) with two dissimilar FPGAs. Based on channel identification, these FPGAs can be loaded from a flash memory at runtime with unique soft cores (e.g., Core A, Core B, and Core C) and execute resident software associated with that core (e.g., Active or Monitor). In this way, the configurable triple channel system 200 divorces the silicon, the physical FPGAs, from the logic, the logical cores. Note that the configurable triple channel system 200 is not limited to FCCs and can be employed by vehicle management systems (VMC), vehicle management computers (VMC), and flight control systems (FCS) according to one or more embodiments.

In view of the above, FIG. 3 depicts a set of tables 310 and 350 illustrating advantages of a configurable triple channel system 200 over the conventional triple channel system 100. Table 310 depicts three controllers per channel where each controller rotates between active, monitor, or disabled responsibilities. Note that a maximum number of channels that the conventional triple channel system 100 can support is six (6) channels without adding an additional controller.

In contrast, table 350 depicts two FPGAs per channel where each FPGA rotates between three cores that further rate between two operational states (active or monitor). Thus, the configurable triple channel system 200 can support twelve (12) channels under its depicted configuration. Further, the configurable triple channel system 200 includes the ability to support additional channels without adding additional controllers by utilizing addition core configurations. Thus, the technical effects and benefits of embodiments of the configurable system include the configurable system being adaptable to redundancy systems other than the triple channel systems described herein, such as dual channel systems, quad channel systems, etc.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A configurable channel system, comprising:
   a plurality of control channels; and
   a plurality of processing platforms,
   each of the plurality of processing platforms being associated with one of the plurality of control channels and being configured to perform channel management and channel monitoring of the associated one of the plurality of control channels, each of the plurality of processing platforms comprising:
   a first microcontroller comprising a first core; and
   a second microcontroller comprising a second core, wherein the second microcontroller is dissimilar to the first microcontroller, wherein each of the plurality of processing platforms loads a unique soft core from a corresponding flash memory at a runtime and executes on the first core and the second core resident software in one of an active state and a monitor state, wherein the first core is configured in the active state to perform the channel management of the associated one of the plurality of control channels, and wherein the second core is configured in the monitor state to perform the channel monitoring of the associated one of the plurality of control channels.

2. The configurable channel system of claim 1, wherein the first and second microcontrollers of each of the plurality of processing platforms comprise field-programmable gate arrays.

3. The configurable channel system of claim 1, wherein the active state is an operational mode of the first core that manages signals on the control channel.

4. The configurable channel system of claim 1, wherein the monitor state is an operational mode of the second core that observes operations of the first core.

5. The configurable channel system of claim 1, wherein the processing platform is installed on a flight control system of an aircraft.

6. A configurable triple channel system, comprising:
a plurality of control channels; and
a plurality of processing platforms comprising a first, each processing platform being associated with one of the plurality of control channels and being configured to perform channel management and channel monitoring of the associated one of the plurality of control channels, the plurality of control channels comprising three control channels, the plurality of processing platforms comprising three processing platforms each of which is associated with one of the three control channels, each processing platform of the plurality of processing platforms comprising a first microcontroller and a second microcontroller, the second microcontroller being dissimilar to the first microcontroller, wherein different cores are loaded onto the first microcontroller and the second microcontroller, wherein a first processing platform of the plurality of processing platforms comprises a first core being loaded on the first microcontroller and a second core being loaded on the second microcontroller, wherein a second processing platform of the plurality of processing platforms comprises the second core being loaded on the first microcontroller and the first core being loaded on the second microcontroller, wherein a third processing platform of the plurality of processing platforms comprises the first core being loaded on the first microcontroller and a third core being loaded on the second microcontroller.

7. The configurable triple channel system of claim 6, wherein the first and second microcontrollers comprise field-programmable gate arrays.

8. The configurable triple channel system of claim 6, wherein a first core of the different cores is configured in an active state that manages signals on the associated one of the plurality of control channels.

9. The configurable triple channel system of claim 6, wherein a first core of the different cores is configured in a monitor state that observes operations of the associated one of the plurality of control channels.

10. The configurable triple channel system of claim 6, wherein the different cores are loaded from flash memories corresponding to the first and second microcontrollers at a runtime.

11. The configurable triple channel system of claim 6, wherein the processing platform is installed on a flight control system of an aircraft.

* * * * *